US009784408B2

(12) United States Patent
Bennett et al.

(10) Patent No.: US 9,784,408 B2
(45) Date of Patent: Oct. 10, 2017

(54) RESILIENT CROSS ARM ASSEMBLY

(71) Applicants: Austin Cary Bennett, Oklahoma City, OK (US); Jackson Robert Jandreau, Oklahoma City, OK (US); William Benjamin Russell, Edmond, OK (US); Jimmy Bollman, Oklahoma City, OK (US)

(72) Inventors: Austin Cary Bennett, Oklahoma City, OK (US); Jackson Robert Jandreau, Oklahoma City, OK (US); William Benjamin Russell, Edmond, OK (US); Jimmy Bollman, Oklahoma City, OK (US)

( * ) Notice: Subject to any disclaimer, the term of this patent is extended or adjusted under 35 U.S.C. 154(b) by 186 days.

(21) Appl. No.: 14/837,162

(22) Filed: Aug. 27, 2015

(65) Prior Publication Data
US 2017/0063068 A1    Mar. 2, 2017

(51) Int. Cl.
*H02G 7/00*    (2006.01)
*F16M 13/02*   (2006.01)

(52) U.S. Cl.
CPC .............. *F16M 13/02* (2013.01); *H02G 7/00* (2013.01)

(58) Field of Classification Search
CPC .. H02G 7/00; H02G 7/02; H02G 7/04; H02G 7/05; H02G 7/20; H02G 7/205;
(Continued)

(56) References Cited

U.S. PATENT DOCUMENTS 3,574,104 A * 4/1971 Medler .................. E04H 12/20
                                                174/45 R
3,858,374 A * 1/1975 Ben-Zvi .................. E04C 3/26
                                                  52/223.8
(Continued)

FOREIGN PATENT DOCUMENTS

WO         8901108 A1    2/1989
WO         0050709 A1    8/2000
WO      2009049377 A1    4/2009

OTHER PUBLICATIONS

U.S. Department of Energy, Office of Electricity Delivery and Energy Reliabilty, Infrastructure Security and Energy Restoration, Energy Assurance Daily, dated Feb. 10, 2011.
(Continued)

*Primary Examiner* — Angel R Estrada
(74) *Attorney, Agent, or Firm* — D. Ward Hobson

(57) ABSTRACT

A synthetic cross arm is provided for use in structural support of conductors on utility poles in an electrical grid. The synthetic cross arm consists of a flexible housing and a cable positioned within a chamber of the flexible housing. The cable is configured to prevent pieces of the synthetic cross arm from separating, falling, or pulling down or breaking utility lines or adjacent cross arms upon a break to the synthetic cross arm. A collar is provided for connecting two cross arms in a horizontal position on a vertical utility pole. A cross arm assembly is provided that includes a collar and first and second cross arms connected thereto. The cross arm assembly is configured so that the first and second cross (Continued)

arms may flex, deform, and rebound, thus reducing or preventing damage to the cross arm assembly.

8 Claims, 6 Drawing Sheets

(58) Field of Classification Search
CPC .... H02G 7/053; F16M 13/02; F16M 2200/00; E04H 12/24
USPC ......... 174/40 R, 45 R, 174, 146; 52/40, 697, 52/220.1, 220.7, 220.8; 248/49, 68.1
See application file for complete search history.

(56) References Cited

U.S. PATENT DOCUMENTS

| | | | | |
|---|---|---|---|---|
| 4,262,047 | A * | 4/1981 | Barnett | E04H 12/24 52/40 |
| 4,407,601 | A | 10/1983 | Reeder | |
| 6,347,488 | B1 * | 2/2002 | Koye | E04H 12/24 174/146 |
| 6,667,442 | B1 * | 12/2003 | Hilligoss | H02G 7/053 174/174 |
| 6,834,469 | B2 * | 12/2004 | Fingerson | E04H 12/24 52/40 |
| 7,007,438 | B1 * | 3/2006 | Shields | E04C 3/14 52/712 |
| 9,546,498 | B2 * | 1/2017 | Britt, Jr. | E04H 12/24 |
| 2002/0095904 | A1 | 7/2002 | Fingerson et al. | |

OTHER PUBLICATIONS

Dan Sokil, Power out for Towamencin neighborhoods due to downed power line, The Reporter, http://www.thereporteronline.come, dated Jul. 17, 2014.
Dennis Hayward, Wood Poles: How long do they last? 30 . . . 45 . . . 60 . . . 100 years? It makes a difference!, Wood Pole Newsletter, vol. 20, IEEE/PES Expo Edition, 1996, Western Wood Preservers Institute.
Maclean Power Systems, www.macleanpower.com, Tangent Centermount Specifications, dated Aug. 10, 2015.
Aluma-Form, Arms and Braces, www.alumaform.com/armsbraces.html, dated Aug. 10, 2015.
Cobb Lumber, Utility Poles, www.cobblumber.com/utility-poles, dated Aug. 10, 2015.
Mykin Inc., Custom Molded Rubber, mykin.com, dated Aug. 10, 2015.
Itran Precision Rubber, Rubber Manufacturing Services, www.itranrubber.com, dated Aug. 10, 2015.
North American Wood Pole Council, Advantages of penta-treated poles highlighted, www.woodpoles.org, Aug. 10, 2015.
Matweb, material property data, www.matweb.com, Aug. 10, 2015.
National Weather Service Weather Forecast Office, Heavy Snow in Oklahoma—Where, When, and How Often?, www.srhnoaa.gov, Feb. 24, 2015.
Harvard, Slips: Slippery Liquid-Infused Porous Surfaces, http://wyss.harvard.edu, Aug. 10, 2015.

* cited by examiner

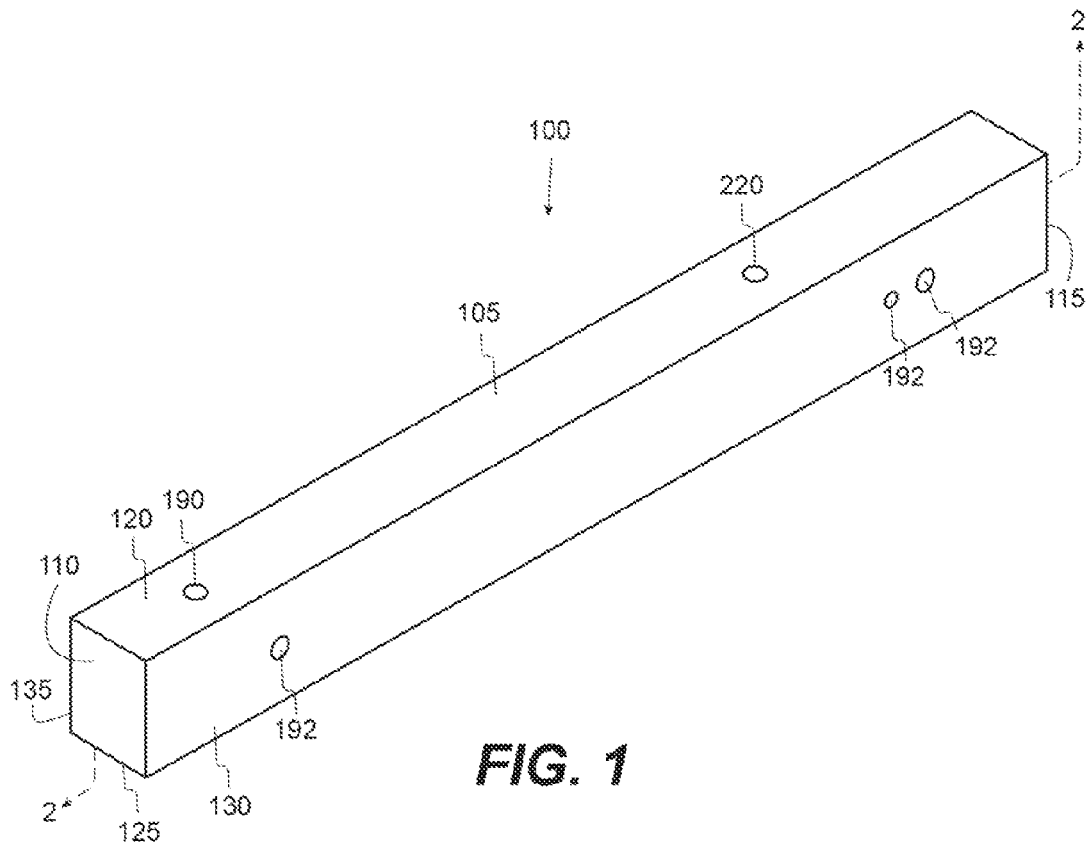
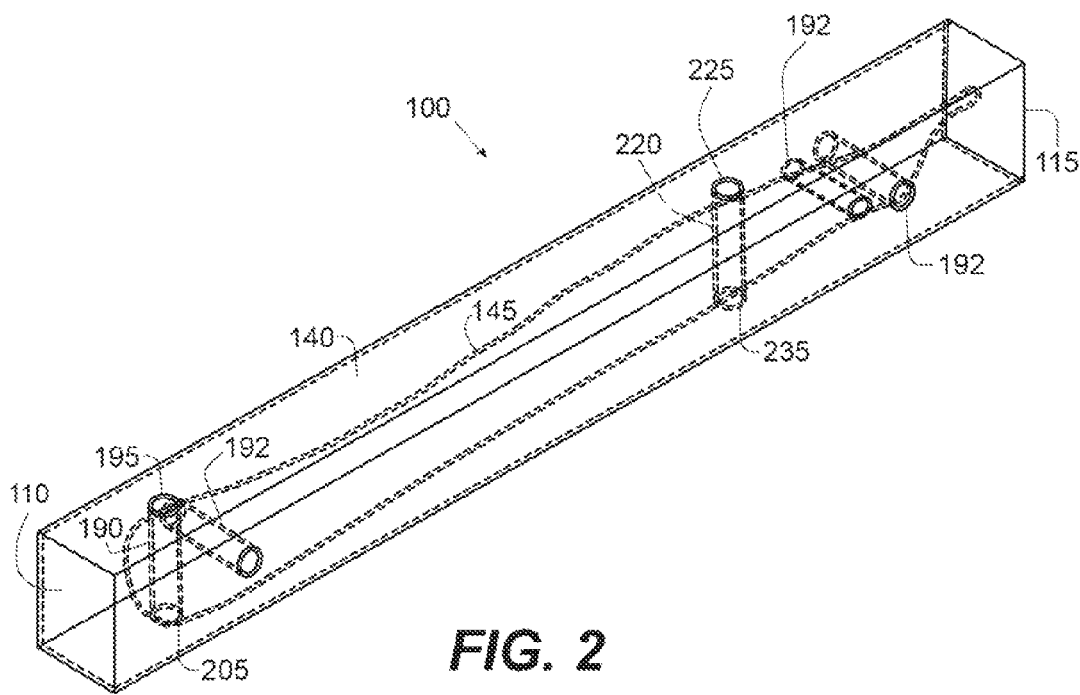

RESILIENT CROSS ARM ASSEMBLY

BACKGROUND

Wind, rain, snow, ice, and other environmental conditions can cause damage to above ground utility distribution systems such as electrical utility lines supported by cross arm assemblies. Sometimes, significant structural damage may occur, including partial or complete breakage of the utility line and cross arm assembly, causing power outages, fire, and other safety hazards to humans.

For example, heavy ice or snow may accumulate on utility lines increasing the weight of the utility line and causing the utility line and cross arm assembly to break. Upon a break to the cross arm assembly, pieces of the broken cross arm often fall or pull down or break the utility line or adjacent cross arms. Further, strong winds may cause utility lines to bounce up and down or "gallop." Galloping wires generate stress upon utility lines and cross arm assemblies. This stress deteriorates, weakens, and often breaks the cross arm assembly, utility line, and adjacent cross arms. Thus, requiring the cross arm assembly to be frequently inspected, repaired, and replaced.

Cross arms are used to support conductors used in power grids. Generally, there are two main types of power grids transmission grids and distribution grids. Transmission grids transmit high-voltage electrical energy from power plants to substations. Distribution grids transmit low-voltage electrical energy from substations to residencies and businesses that require the power. Cross arms used in distribution grids are typically made from wood, such as timber which has been prepared for use in building and carpentry.

Unfortunately, wood cross arms are often expensive difficult to obtain, have a limited lifespan, and require frequent maintenance and repair. Further, wood cross arms are organic and thus decay naturally over time. The typical lifespan of a wood cross arm decreases substantially when the wood cross arm is exposed to harsh environmental conditions, such as hot and cold temperatures, ice, snow, rain, and wind, for example.

To increase the lifespan and durability of wood cross arms, the wood is often treated with chemical compounds and preservatives, such as creosote, to provide ultraviolet and water protection. Creosote is a dark brown oil often distilled from coal tar that is commonly used as a wood preservative. Creosote generally includes a number of phenols, cresols, and other organic compounds. While, chemicals, such as creosote can improve the lifespan and durability of wood cross arms, such chemicals also add increased cost to the cross arm and may pose environmental concerns. Other problems presented by wood cross arms are that the wood is flammable, and thus susceptible to lightning strike-induced fires. Wood cross arms may also attract bugs and animals, such as termites and woodpeckers, who prematurely damage the structural integrity of the wood.

Wood alternatives such as fiberglass, concrete, and metal cross arms are known. Unfortunately, traditional fiberglass cross arms lack the structural strength and durability of wood cross arms and are often more expensive. Further, upon a break to a traditional fiberglass cross arm, pieces of the fiberglass cross arm fall and pull down and break the utility line. While having increased structural integrity, compared to traditional fiberglass cross arms concrete and metal cross arms are typically heavy, making the cross arms more difficult and dangerous for workers to suspend high above the ground and more difficult to repair, inspect and replace. Further, because metal is a good conductor of electricity, metal cross arms increase the danger to lineman and other workers. Thus, lineman must take increased safety precautions when working with metal cross arms slowing their work, increasing the cost of the work, and reducing the usefulness of metal cross arms.

In addition to the problems discussed above, traditional cross arm assemblies are not effective at reducing or preventing damage caused by galloping utility lines and environmental conditions such as wind, ice and snow. Current cross arms are typically formed from a single unitary piece of material, generally wood, that is connected to a utility pole at a center region of the cross arm. Thus, forming a "cross" configuration between the horizontal cross arm and the vertical utility pole whereby the cross arm is divided into two substantially equal sections or halves by the utility pole. The cross arm is typically supported by v-braces, typically formed from wood, or other similar structures positioned underneath the cross arm and connected to the utility pole.

In the event the cross arm is broken or damaged, the v-brace is usually broken as well, causing pieces of the broken cross arm to fall and pull down and break the utility line, causing power outages and hazardous conditions for persons. Upon a break to the cross arm assembly, pieces of the broken cross arm often fall or pull down or break the utility line or adjacent cross arms. Further, in the event any portion of the cross arm or v-brace is damaged, the entire length of the cross arm and supporting v-brace must generally be replaced even if only one section or half of the cross arm was actually damaged or broken. Thus, increasing the cost and burden associated with replacing, repairing, and inspecting such cross arm assemblies.

To that end, it would be advantageous to provide an improved resilient cross arm assembly configured to reduce or prevent damage caused by galloping utility lines and environmental conditions such as, ice, snow, and wind. The resilient cross am assembly includes a synthetic cross arm having a flexible housing, formed from ultraviolet resistant fiberglass for example, and includes a cable positioned within an internal chamber of the flexible housing that extends between a first end and a second end of the flexible housing. The cable is configured to prevent pieces of the synthetic cross arm from separating, falling, and pulling down and breaking the utility lines upon a break in the synthetic cross arm. Upon a break to the cross arm assembly, pieces of the broken cross arm often fall or pull down or break the utility line or adjacent cross arms.

The resilient cross arm assembly further includes a collar that is configured to attach two cross arms, for example traditional wood cross arms or synthetic cross arms, to a utility pole on opposite ends. The collar is configured so that each cross arm may flex or move vertically to absorb shock caused by galloping utility lines and heavy ice or snow. Because the collar is configured for use with two cross arms, if one cross arm is broken, only the broken cross arm would need to be replaced. Thus, increasing the cost effectiveness of the resilient cross arm assembly and decreasing the risk of injury to persons tasked with repairing, replacing, or inspecting the resilient cross arm assembly. It is to such a resilient cross arm assembly and to methods for using thereof that exemplary embodiments of the inventive concepts disclosed and claimed herein are directed.

BRIEF DESCRIPTION OF THE SEVERAL VIEWS OF THE DRAWINGS

Like reference numerals in the figures represent and refer to the same or similar element or function. Implementations of the disclosure may be better understood when consideration is given to the following detailed description thereof. Such description makes reference to the annexed pictorial illustrations, schematics, graphs, drawings, and appendices. In the drawings:

FIG. 1 is a perspective view of an exemplary embodiment of a synthetic cross arm according to the inventive concepts disclosed herein.

FIG. 2 is a perspective cross sectional view of an exemplary embodiment of a synthetic cross arm according to the inventive concepts disclosed herein.

DETAILED DESCRIPTION OF EXEMPLARY EMBODIMENTS

Figure 3:
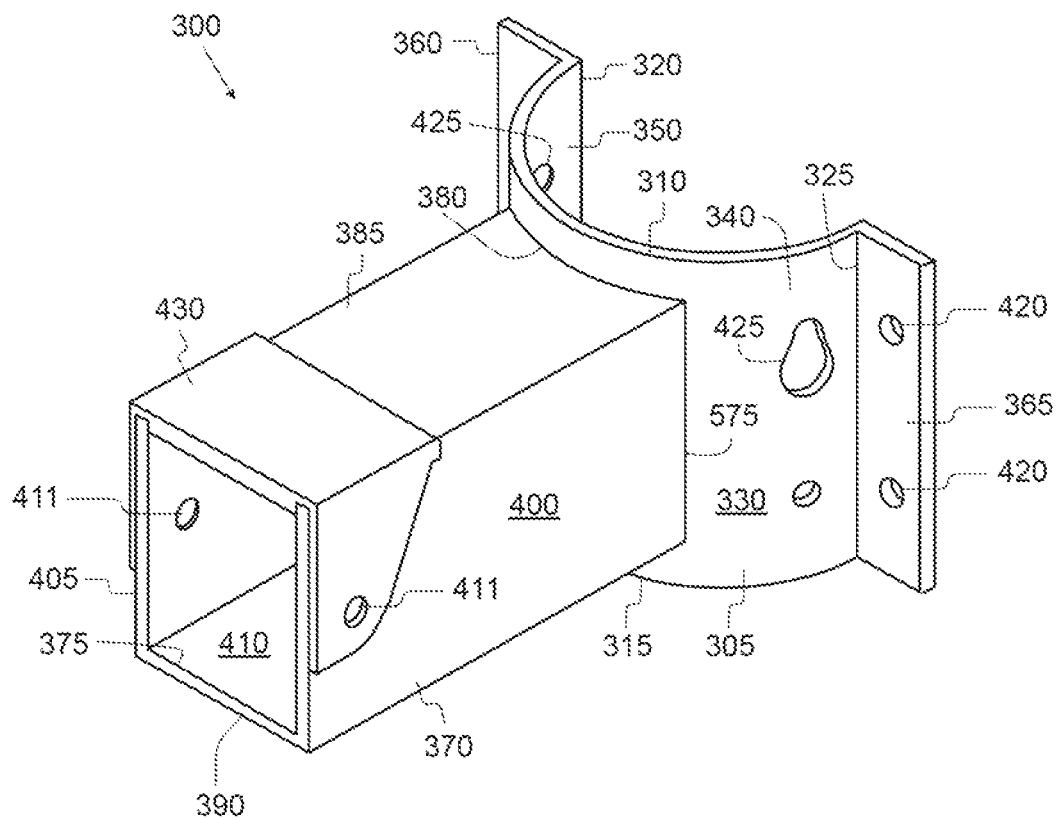
FIG. 3 is a perspective view of an exemplary embodiment of a collar for connecting a cross arm to a utility pole according to the inventive concepts disclosed herein.

Before explaining at least one embodiment of the inventive concepts disclosed herein in detail, it is to be understood that the inventive concepts are not limited in their application to the details of construction and the arrangements of the components or steps or methodologies set forth in the following description or illustrated in the drawings. The inventive concepts disclosed herein are capable of other embodiments or of being practiced or carried out in various ways. Also, it is to be understood that the phraseology and terminology employed herein is for the purpose of description and should not be regarded as limiting the inventive concepts claimed herein in any way.

In the following detailed description of embodiments of the inventive concepts, numerous specific details are set forth in order to provide a more thorough understanding of the inventive concepts. However, it will be apparent to one of ordinary skill in the art that the inventive concepts within the disclosure may be practiced without these specific details. In other instances well-known features have not been described in detail to avoid unnecessarily complicating the instant disclosure.

As used herein, the terms "comprises," "comprising," "includes," "including," "has," "having," or any other variation thereof, are intended to cover a non-exclusive inclusion. For example, a process, method, article, or apparatus that comprises a list of elements is not necessarily limited to only those elements but may include other elements not expressly listed.

As used herein the notation "a-n" appended to a reference numeral is intended as merely convenient shorthand to reference one, or more than one, and up to infinity, of the element or feature identified by the respective reference numeral (e.g., 305a-n). Similarly, a letter following a reference numeral is intended to reference an embodiment of the feature or element that may be similar, but not necessarily identical, to a previously described element or feature bearing the same reference numeral (e.g., 305, 305a, etc.). Such shorthand notations are used for purposes of clarity and convenience only, and should not be construed to limit the instant inventive concept(s) in any way, unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the inventive concepts. This description should be lead to include one or at least one and the singular also includes the plural unless it is obvious that it is meant otherwise.

Finally, as used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

The inventive concepts disclosed herein are generally directed to a synthetic cross arm, a collar, and a cross arm assembly. The synthetic cross arm includes a flexible housing, formed from ultraviolet resistant fiberglass for example, and a cable positioned within an internal chamber of the flexible housing that extends between a first end and a second end of the flexible housing. The cable is configured to prevent pieces of the synthetic cross arm from separating, falling, or pulling down or breaking a utility line upon a break in the synthetic cross arm. Upon a break to the cross arm assembly, pieces of the broken cross arm often fall or pull down or break the utility line or adjacent cross arms. The collar is for attaching two cross arms in a horizontal position, for example traditional wood cross arms or synthetic cross arms, to a vertical utility pole on opposite ends. The collar is configured so that each cross arm may flex or move vertically to absorb shock caused by galloping utility lines and heavy ice or snow. The cross arm assembly includes a collar and first and second cross arms detachably connected thereto. Because the cross arm assembly is configured for use with two cross arms, if one cross arm is broken, only the broken cross arm would need to be replaced. Thus, increasing the cost effectiveness of the resilient cross arm assembly and decreasing the risk of injury to persons tasked with repairing, replacing, or inspecting the cross arm assembly.

Referring now to FIGS. 1-2, shown therein is an exemplary embodiment of a synthetic cross arm 100. The synthetic cross arm 100 includes a flexible housing 105 having a first end 110, a second end 115, a top 120, a bottom 125, and a front 130 and back 135 defining a chamber 140 therein. The synthetic cross arm 100 further includes a cable 145 connected to the flexible housing 105. The cable 145 is positioned within the chamber 140 of the flexible housing 105 and extends between the first end 110 and the second end 115 of the flexible housing 105. The cable 145 is configured to prevent the synthetic cross arm from separating, falling, or damaging utility lines upon a break to the synthetic cross arm. Upon a break to the cross arm assembly, pieces of the broken cross arm often fall or pull down or break the utility line or adjacent cross arms.

Figure 4:
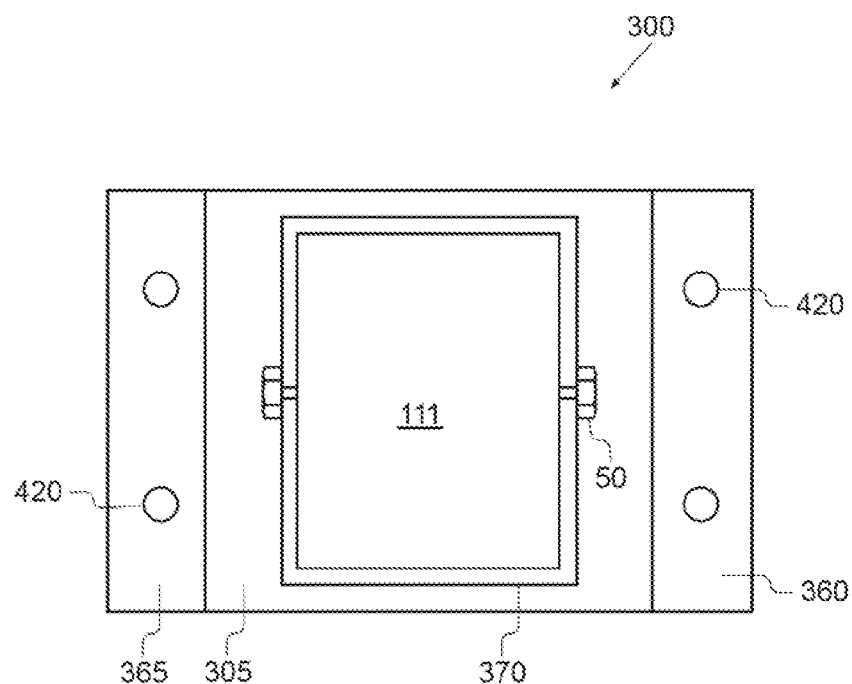
FIG. 4 is a front view of an embodiment of a collar for connecting a cross arm to a utility pole according to the inventive concepts disclosed herein.
Figure 5:
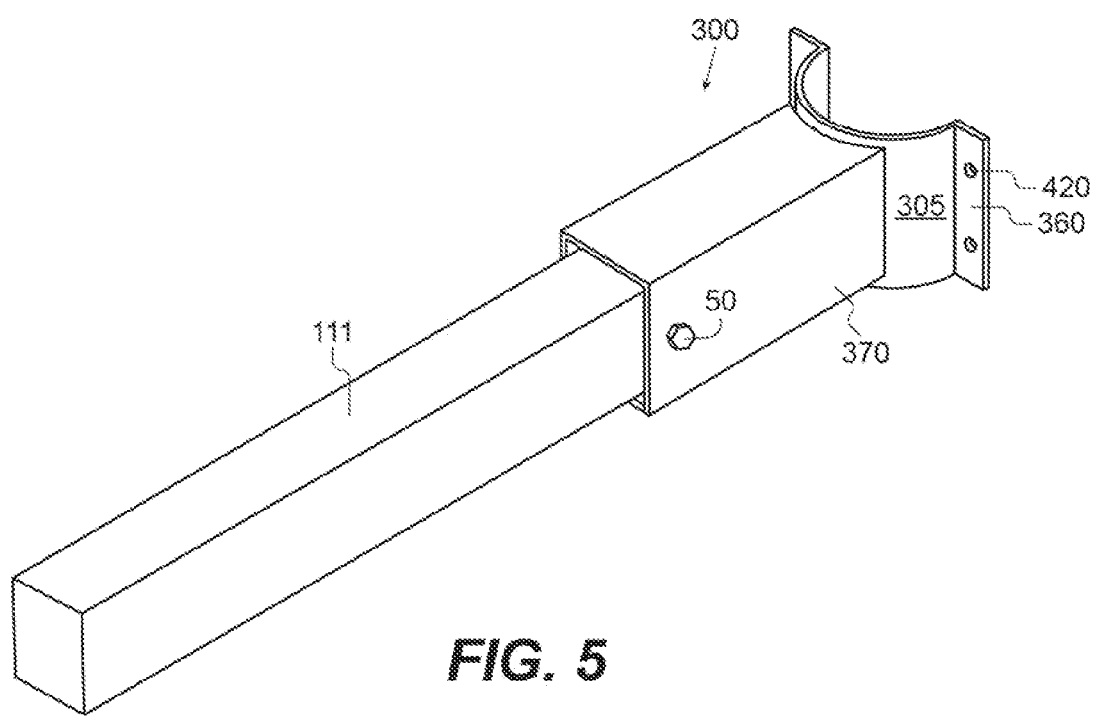
FIG. 5 is a perspective view of an embodiment of a collar for connecting a cross arm to a utility pole according to the inventive concepts disclosed herein.

The synthetic cross arm 100 is configured to be attached horizontally to a vertical utility pole. In some embodiments, the synthetic cross arm 100 may be sized so as to be used with traditional cross arm mounting tools, devices, and installation techniques. In some embodiments, the synthetic cross arm 100 may be sized so that two synthetic cross arms 100 may be utilized in combination with the collar (as shown in FIGS. 3-5) described herein.

The flexible housing 105 of the synthetic cross arm 100 may be any desired shape, including a substantially rectangular, square, oval, or circular shape. In some embodiments, the flexible housing 105 may be substantially rectangular in shape, while in some embodiments, the flexible housing 105 may be substantially oval or may have any other desired shape, as will be appreciated by persons of ordinary skill in the art having the benefit of the instant disclosure.

The flexible housing 105 may be constructed from any desired material that is sufficiently flexible, lightweight, and durable. The flexibility of the flexible housing 105 permits the synthetic cross arm 100 to absorb shock upon an impact force to the synthetic cross arm 100. The ductility of the flexible housing 105 permits the synthetic cross arm 100 to deform and rebound after an impact force to the flexible housing 105. For example, the deformation properties of the flexible housing 105 permit the flexible housing 105 to rebound back to its original shape after being deflected downwards by an impact force or weight. Thus, reducing or preventing damage to the synthetic cross arm 100 caused by galloping utility lines and strong winds, rain, snow, or ice.

Preferably, the flexible housing 105 is constructed from fiberglass. In particular, fiberglass having ultraviolet resistant properties. Fiberglass is flexible, lightweight and non-conductive making it a preferred material for constructing the flexible housing 105. It should be understood however, that the flexible housing 105 may be constructed from any material that is sufficiently durable, lightweight, and flexible. For example, the flexible housing 105 may be constructed from carbon fiber, synthetic fiber, reinforced fiber, ultraviolet resistant fiber reinforced material, plastics, resins, non-metals, composite materials, combinations thereof, and the like. Further, in some embodiments, the flexible housing 105 may include reinforcing or bracing structures to increase the strength and durability of the flexible housing 105, such as struts, ribs, braces, rods, or any other suitable reinforcing or bracing structure, or combinations, thereof and the like.

The synthetic cross arm 100 includes a chamber 140. The chamber 140 is positioned within the flexible housing 105. The chamber 140 is defined by the first end 110, second end 115, top 120, bottom 125, and front 130 and back 135. The chamber 140 may be may be any desired shape, including a substantially rectangular, square, oval, or circular shape. In some embodiments, the chamber 140 may be substantially rectangular in shape, while in some embodiments, the chamber 140 may be substantially oval or may have any other desired shape, as will be appreciated by persons of ordinary skill in the art having the benefit of the instant disclosure. In some embodiments the chamber 140 may be substantially the same shape as the flexible housing 105, while in some embodiments the chamber 140 may have a different shape from the flexible housing 105. For example, the flexible housing 105 may be substantially rectangular in shape, while the chamber 140 may be substantially rectangular or oval in shape. In some embodiments, the chamber 140 may also include insulation for increasing the durability and structural integrity of the flexible housing 105. For example, the insulation may include foam, rubber, plastics, combinations thereof, and the like.

In some embodiments, the flexible housing 105, may also include one or more openings 192 extending completely or partially through the flexible housing 105 and the chamber 140. In this way, a bolt or other connecting rod or member may be selectively inserted through the openings 192 so as to connect the synthetic cross arm 100 to a utility pole, collar, or other cross arm connecting assembly. For example, a bolt may be inserted through the opening 192 in the synthetic cross arm 100 and through a collar connected to a utility pole. The bolt may be selectively inserted and locked by a locking mechanism to keep the synthetic cross arm 100 locked into place within the collar and secured to the utility pole. Further, the bolt may be selectively removed and the locking mechanism unlocked so that the synthetic cross arm 100 may be removed, repaired or replaced, as needed.

The synthetic cross arm 100 further includes a cable 145 connected to the flexible housing 105. The cable 145 positioned within the chamber 140 of the flexible housing 105 and extending between the first end 110 and the second end 115 of the flexible housing 105. Preferably, the cable 145 is formed from synthetic rope. Synthetic rope is durable, lightweight, and non-conductive. It should be understood, however, that the cable 145 may be formed from any desired material that has sufficient strength to support the weight of the synthetic cross arm 100. For example, the cable 145 may be constructed from rope, fiber, synthetic rope, metal chain, carbon fiber, plastics, non-metals, composite materials, combinations thereof, and the like. Further, in some embodiments, the cable 145 may include reinforcing or bracing structures, such as wire, rods, braces, or any other suitable reinforcing or bracing structure, or combination thereof and the like.

The cable 145 may be connected to the flexible housing 105, at any desired location substantially near the first end 110 and the second end 115. For example, the cable 145 may be positioned within the chamber 140 of the flexible housing 105 and connected to the first end 110, second end 115, top 120, bottom 125, front 130 or back 135. It is to be appreciated that the cable 145 may be connected to the flexible housing 105 in any desired manner such as via welds, seams, joints, bars, screws bolts, adhesives, hooks, loops, rings, combinations thereof, and the like.

In some embodiments, the synthetic cross arm 100 also includes a first connector member 190 and second connector member 220 positioned within the chamber 140 of the flexible housing 105. The first connector member 190 includes a first end 195 connected to the top 120 of the flexible housing 105 and a second end 205 connected to the bottom 125 of the flexible housing 105. The second connector member 220 has a first end 225 connected to the top 120 of the flexible housing 105 and a second end 235 connected to the bottom 125 of the flexible housing 105.

The first connector member 190 and second connector member 220 may be any desired shape, including a substantially rectangular, square, oval, or circular shape. In some embodiments, the first connector member 190 and second connector member 220 may be substantially rectangular in shape, while in some embodiments, the first connector member 190 and second connector member 220 may be substantially oval or may have any other desired shape, as will be appreciated by persons of ordinary skill in the art having the benefit of the instant disclosure.

The first connector member 190 and second connector member 220 may be constructed from any desired material that is sufficiently lightweight and capable of connecting the cable 140 therebetween. For example, the first connector member 190 and second connector member 220 may be constructed from fiberglass, metal, carbon fiber, plastics, non-metals, composite materials, combinations thereof, and the like. In some embodiments, the first connector member 190 and second connector member 220 may be formed from the same material as the flexible housing 105, while in some embodiments, the first connector member 190 and second connector member 220 may be formed from a different material than the flexible housing 105.

The first connector member 190 and second connector member 220 may be connected to the flexible housing 105 in any desired manner such as via welds, joints, screws, bolts, adhesives, rods, or combinations thereof. In some embodiments the first connector member 190 and second connector member 220 may be partially embedded or encased in the flexible housing 105, while in some embodiments the first connector member 190 and second connector member 220 may be formed as a unitary body, for example. Further, in some embodiments, the first connector member 190 and second connector member 220 may be substantially hollow so as to permit a bolt or rod to be selectively inserted through the first connector member 190 and second connector member 220. The bolt or rod may be used to secure the synthetic cross arm 100 to a collar by inserting the bolt or rod through the first connector member 190 or second connector member 220 so as to secure the synthetic cross arm 100 to a collar, or a utility pole.

In some embodiments the cable 145 is connected to the flexible housing 105 by looping the cable 145 around the first connector member 190 and the second connector member 220. In this way, the cable 145 extends between the first end 110 and the second end 115 so as to prevent a portion of the flexible housing 105 from falling upon a break to the flexible housing 105. The cable 145 prevents a portion of the synthetic cross arm 100 from falling on and pulling down power lines, causing power outages and hazardous conditions for persons.

Referring now to FIGS. 3-5, shown therein is an exemplary embodiment of a collar 300 for connecting a cross arm 111 to a utility pole. The collar 300 is configured to fit around half of a utility pole and connect to an identical structure on the opposite side of the utility pole. In the event that the cross arm 111 connected to the collar 300 breaks, the broken cross arm 111 can be selectively removed and replaced without having to remove or replace the collar 300 and without having to remove or replace the cross arm 111 attached to the identical structure on the oppose side of the utility pole. In this way, the collar 300 permits both the synthetic cross arm 100 and traditional cross arms, to be more efficiently repaired and replaced. The collar 300 may be manufactured to fit different utility pole diameters, as will be appreciated by one of ordinary skill in the art having the benefit of the instant disclosure.

The collar 300 includes a first member 305 having a top end 310, a bottom end 315, and first and second sides (320 and 325) extending between the top and bottom ends (310 and 315) defining a plane 330. The plane 330 includes an outer surface 340 and an inner surface 350. The collar 300 includes a first and second flange (360 and 365). The first flange 360 is connected to the first side 320 of the first member 305. The second flange 365 is connected to the second side 325 of the first member 305. The collar 300 also includes a first sleeve 370 having a first end 375, a second end 380, a top 385, a bottom 390, and a front 400 and back 405 defining a chamber 410 therein. The second end 380 of the first sleeve 370 is connected to the outer surface 340 of the plane 330 of the first member 305. The second end 380 of the first sleeve 370 includes an opening for receiving a portion of a cross arm 111 into the chamber 410 of the first sleeve 370.

The first member 305 has a top end 310, a bottom end 315, and first and second sides (320 and 325) extending between the top and bottom ends (310 and 315) defining a plane 330. The plane has an outer surface 340 and an inner surface 350. The first member 305 has a generally curved or semi-circular shape. It should be understood however, that the first member 305 may have any desired shape, including a substantially square or rectangular shape, for example.

The first member 305 may be constructed from any desired material that has sufficient durability and structural integrity to support the weight of the utility lines, the collar 300, and cross arms inserted therein on the utility pole. For example, the first member 305 may be constructed from metal, steel, stainless steel, iron, alloys, reinforced metals, fiberglass carbon fiber, plastics, non-metals, composite materials, combinations thereof, and the like. Preferably, the first member 305 is formed from metal, such as stainless steel. While steel is preferred, it should be understood, that the first member 305 may be constructed from any material that is sufficiently durable to support the weight of the cross arm, the collar 300, and the utility lines supported by the utility pole. Further, in some embodiments, the first member 305 may include reinforcing or bracing structures, such as struts, ribs, braces, rods, or any other suitable reinforcing or bracing structure, or combinations, thereof and the like.

The collar 300 includes a first and second flange (360 and 365). The first flange 360 is connected the first side 320 of the first member 305. The second flange 365 is connected to the second side 325 of the first member 305. The first flange 360 and second flange 365 have a substantially rectangular shape. It should be understood, however, that the first flange 360 and second flange 365 may have any desired shape, including a substantially circular, oval, or square shape. In some embodiments, the first and second flange (360 and 365) may be substantially rectangular in shape, while in some embodiments, the first and second flange (360 and 365) may be substantially square or may have any other desired shape, as will be appreciated by persons of ordinary skill in the art having the benefit of the instant disclosure.

The first and second flange (360 and 365) may be constructed from any desired material that is of sufficient durability and structural integrity to support the collar 300, cross arms inserted therein, and utility lines on the utility pole. For example, the first and second flange (360 and 365) may be constructed from metal, steel, stainless steel, iron, alloys, reinforced metals, fiberglass, carbon fiber, plastics, non-metals, composite materials, combinations thereof, and the like. Preferably, the first and second flange (360 and 365) is formed from metal, such as stainless steel. While steel is preferred should be understood, that the first and second flange (360 and 365) may be constructed from any material that is sufficiently durable to support the weight of the cross arm, collar 300, and utility lines supported on the utility pole. Further, in some embodiments, the first and second flange (360 and 365) may include reinforcing or bracing structures, such as struts, ribs, braces, rods, or any other suitable reinforcing or bracing structure, or combinations, thereof and the like.

The first flange 360 is connected to the first side 320 of the first member 305. The second flange 365 is connected to the second side 325 of the first member 305. The first flange 360 and second flange 365 may be connected in any desired manner such as via welds, joints, screws, bends, hinges, bolts, adhesives, rods or combinations thereof. In some embodiments, the first flange 360 and second flange 365 may be partially embedded or encased in the first member 305, while in some embodiments the first flange 360 and second flange 365 may be formed as a unitary body with the first member 305, for example.

The collar 300 further includes a first sleeve 370 having a first end 375, a second end 380, a top 385, a bottom 390, and a front 400 and back 405 defining a chamber therein 410 therein. The first sleeve 370 is substantially rectangular in shape. It should be understood, however, that the first sleeve 370 may have any desired shape, including a substantially circular, oval, or square shape. In some embodiments, the first sleeve 370 may be substantially rectangular in shape, while in some embodiments, the first sleeve 370 may be substantially circular or may have any other desired shape, as will be appreciated by persons of ordinary skill in the art having the benefit of the instant disclosure.

The first sleeve 370 may be constructed from any desired material that is of sufficient durability and structural integrity to support the weight of the collar 300, cross arms inserted therein, and utility lines supported thereby and connected to a utility pole. For example, the first sleeve 370 may be constructed from metal, steel, stainless steel, iron, alloys, reinforced metals, fiberglass, carbon fiber, plastics, non-metals, composite materials, combinations thereof, and the like. Preferably, the first sleeve 370 is formed from metal, such as stainless steel. While steel is preferred, it should be understood, that the first sleeve 370 may be constructed from any material that is of sufficient durability and structural integrity to support the collar 300, cross arm inserted therein, and utility lines supported thereby connected to a utility pole. Further, in some embodiments, the first sleeve 370 may include reinforcing or bracing structures, such as struts, ribs, braces, rods, or any other suitable reinforcing or bracing structure, or combinations, thereof and the like.

The second end 380 of the first sleeve 370 is connected to the outer surface 340 of the plane 330 of the first member 305. The second end 380 of the first sleeve 370 includes an opening for receiving a portion of a cross arm into the chamber 410 of the first sleeve 370. The first sleeve 370 may be connected to the first member 305 in any desired manner such as via welds joints, screws, bends, hinges, bolts, adhesives, rods, or combinations thereof. In some embodiments, the first sleeve 370 may be partially embedded or encased in the first member 305, while in some embodiments the first sleeve 370 and the first member may be formed as a unitary body, for example.

The chamber 410 is positioned within the first sleeve 370. The chamber 410 is defined by the first end 375, second end 380, top 385, bottom 390, front 400 and back 405. In some embodiments, the chamber 410 may be formed from the same material as the first sleeve 370, while in other embodiments, the chamber 410 may be formed or lined with a material different from the first sleeve 370.

The chamber 410 may be may be any desired shape, including a substantially rectangular, square, oval, or circular shape sufficient to receive a cross arm. In some embodiments the chamber 410 may be substantially rectangular in shape, while in some embodiments, the chamber 410 may be substantially oval or may have any other desired shape sufficient to receive a cross arm, as will be appreciated by persons of ordinary skill in the art having the benefit of the instant disclosure. In some embodiments, the chamber 410 may be in substantially the same shape as the cross arm, while in some embodiments the chamber 410 may have a different shape from the cross arm. The shape of the chamber 410 is configured for receiving a portion of a cross arm into the chamber 410 and may be modified to fit the shape of the desired cross arm.

In some embodiments, the first sleeve 370 is sized and dimensioned so as to permit vertical movement of the cross arm within the chamber 410. In this way, the cross arm positioned within the first sleeve 370 will move vertically upon an impact force to the cross arm and absorb shock. Thus, preventing or reducing damage to the cross arm. In some embodiments, the first sleeve 370 is sized and dimensioned so as to prevent vertical movement of the cross arm within the chamber 410. In this way, the flexible properties of the cross arm will cause that portion of the cross arm outside of the first sleeve 370 to flex, bend, and rebound. Thus, absorbing an impact force to the cross arm and reducing or preventing damage.

A bolt or rod, such as bolt 50, may be inserted through an opening 411 in the first sleeve 370 and through an opening in the cross arm such as opening 192 in the synthetic cross arm 100, to connect and secure the cross arm to the first sleeve 370 and the collar 300. In some embodiments, when the cross arm pivots around the bolt 50 the vertical movement is dampened by the first sleeve 370. In some embodiments, the vertical movement may be further dampened by cushioning, such as rubber, neoprene, or foam, positioned within and lining the chamber 410 of the first sleeve 370.

Figure 6:
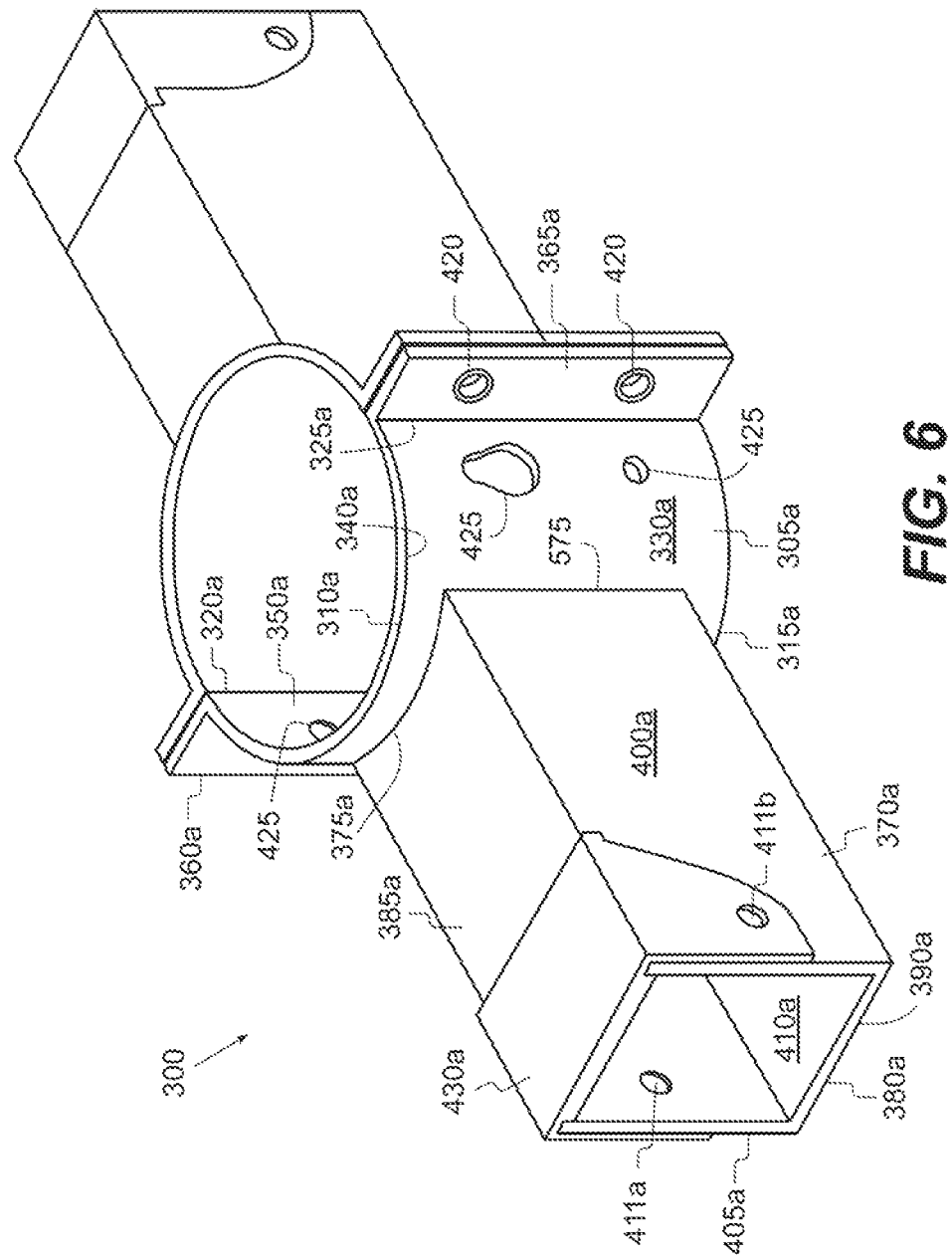
FIG. 6 is a perspective view of an embodiment of a collar for connecting a cross arm to a utility pole according to the inventive concepts disclosed herein.

Referring now to FIG. 6, shown therein is an embodiment of the collar 300 further including a second member 305a, a third and fourth flange (360a and 365a), and a second sleeve 370a. The second member 305a, third and fourth flange (360a and 365a), and second sleeve 370a are implemented similarly and formed similarly to the first member 305, first and second flange (360 and 365) and first sleeve 370.

The second member 305a includes a top end 310a, a bottom end 315a, and first and second sides (320a and 325a) extending between the top and bottom ends (310a and 315a) defining a plane 330a The plane 330a has an outer surface 340a and an inner surface 350a. The collar 300 further includes a third and fourth flange (360a and 365a). The third flange 360a is connected to the first side 320a of the second semi-circle member 305a. The fourth flange 365a is connected to the second side 325a of the second member 305a. The third and fourth flange (360a and 365a) are configured to be detachably connected to the first and second flange (360 and 365) of the first member 305 by a tightening bolt or rod, such as bolt 50 for example. In this way, the first member 305 is detachably connected to the second member 305a.

The collar 300 further includes a second sleeve 370a having a first end 375a, a second end 380a, a top 385a, a bottom 390a, and a front 400a and back 405a defining a chamber 410a therein. The first end 375a of the second sleeve 370a is connected to the outer surface 340a of the plane 330a of the second member 305a. The second end 380a of the second sleeve 370a includes an opening for receiving a portion of a cross arm into the chamber 410a of the second sleeve 370a.

In use, the collar 300 may be secured to a utility pole by connecting the first member 305 to the second member 305a. The collar 300 may be secured and connected to the utility pole by connecting the collar 300 to the utility pole. The collar 300 may be connected to the utility pole using screws, rods, leaf springs, nails, bars, bolts, adhesive, combinations thereof and the like. In some embodiments, the utility pole may be tapered and the collar 300 may connected to the utility pole by placing the collar 300 around the utility pole such that it rests firmly against the utility pole.

In some embodiments, the first flange 360, second flange 365, third flange 360a, and fourth flange 365a include at least one opening 420 extending the therethrough for receiving a connecting rod or bolt, such as bolt 50. The third and fourth flange (360a and 365a) may be detachably connected to the first and second flange (360 and 365) of the first member 305. In this way, the first member 305 may be detachably connected to the second member 305a.

In some embodiments, the collar 300 may be attached to a utility pole by selectively inserting the connecting rod or bolt 50 through the opening 420 and into the utility pole so as to secure the collar 300 to the utility pole. Further, in so embodiments, the first member 305 and the second member 305a may include at least one opening 425 extending therethrough for receiving a connecting rod or bolt, such as bolt 50. The collar 300 may be attached to a utility pole by selectively inserting the connecting rod or bolt through the opening 425 positioned within the first member 305 and second member 305a so as to secure the collar 300 directly to the utility pole. The connecting rod or bolt may include any type of connecting mechanism known in the art, including for example, screws, nails, pins, bolts, tightening bolts, adhesives, combinations thereof, and the like.

In some embodiments, the collar 300 further includes a first locking member 430 coupled with the first sleeve 370. The first locking member 430 is configured to lock a portion of a cross arm into a horizontal position within the chamber 410 of the first sleeve 370. The collar 300 may also include a second locking member 430a coupled with the second sleeve 370a. The second locking member 430a is configured for locking a portion of a cross arm into a horizontal position within the chamber 410a of the second sleeve 370a. The first locking member 430 and second locking member 430a may be implemented similarly. The first locking member 430 and second locking member 430a may also be formed from the same or similar material. For example, steel, iron, carbon fiber, plastics, metals, combinations thereof and the like.

In some embodiments the first locking member 430 and second locking member 430a may be selectively removed from the first sleeve 370 and second sleeve 370a so that each cross arm may be selectively inserted into the chamber 410 and chamber 410a within the first and second sleeve 370 and 370a, from a top position. In this way, each cross arm may be more easily inserted into the first sleeve 370 and second sleeve 370a by a person repairing or replacing the cross arm.

Figure 7:
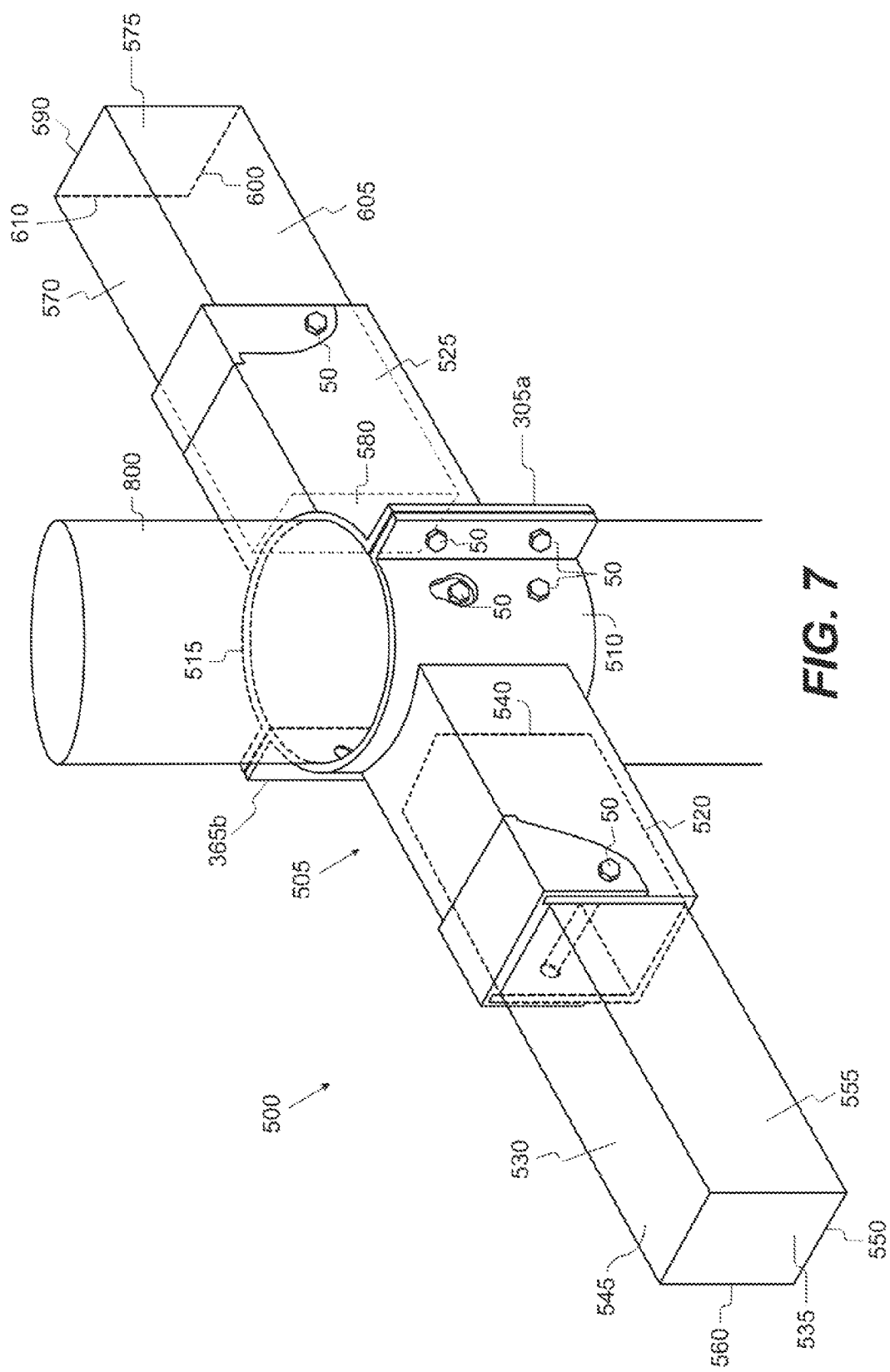
FIG. 7 is a perspective view of an embodiment of a cross arm assembly according to the inventive concepts disclosed herein.
Figure 8:
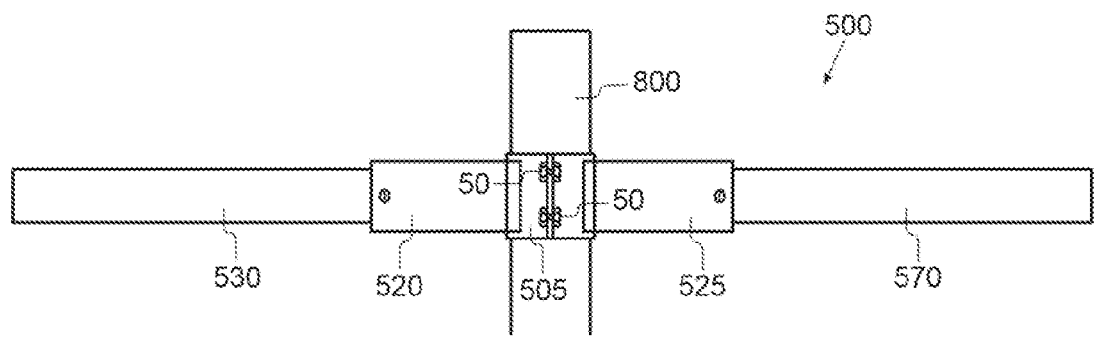
FIG. 8 is a side view of an embodiment of a cross arm assembly according to the inventive concepts disclosed herein.
Figure 9:
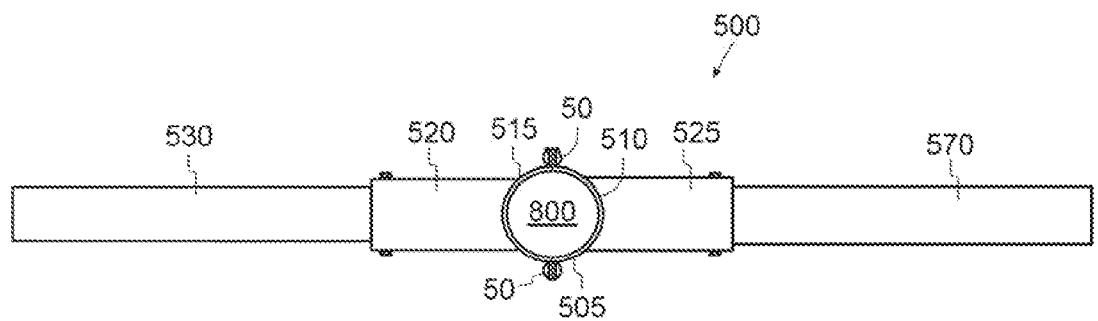
FIG. 9 is a top view of an embodiment of a cross assembly according to the inventive concepts disclosed herein.

Referring now to FIGS. 7-9, shown therein is an exemplary embodiment of a cross arm assembly 500. The cross arm assembly 500 includes a collar 505 configured to be detachably secured to a vertical utility pole 800. The collar 505 includes first and second members (510 and 515) and first and second sleeves (520 and 525) extending horizontally therefrom. The collar 505 operates similarly and may be formed from the same or similar material to the collar 300. The cross arm assembly 500 further includes a first cross arm 530 positioned within and detachably connected to the first sleeve 520. The first cross arm 530 includes a first end 535, a second end 540, a top 545, a bottom 550, and a front 555 and back 560. The cross arm assembly 500 also includes a second cross arm 570 positioned within and detachably connected to the second sleeve 525. The second cross arm 570 including a first end 575, a second end 580, a top 590, a bottom 600, and a front 605 and back 610. In some embodiments, the first cross arm 530 and second cross arm 570 may be formed and operated similarly to the synthetic cross arm 100. While, in some embodiments, the first cross arm 530 and second cross arm 570, may be a traditional cross arm formed from wood, metal, fiberglass or other materials.

In some embodiments, the first cross arm 530 and the second cross arm 570 are movable relative to the collar 505, so as to permit the first cross arm 530 and the second cross arm 570 to absorb shock upon an impact force to the cross arm assembly 500. The first cross arm 530 and second cross arm 570 may be sized and dimensioned to fit loosely within the first sleeve 520 and second sleeve 525, so that upon an impact force, such as high winds, rain snow, or ice to the cross arm system 500, the first cross arm 530 and second cross arm 570 will flex within the first sleeve 520 and second sleeve 525. In this way, the structural integrity and durability of the cross arm system 500 is improved. In some embodiments, the collar 505 is configured so that the first cross arm 530 and second cross arm 570 will not move or will not substantially move within the first and second sleeves (520 and 525) of the collar 505. In this embodiment, the flexible properties of the first cross arm 530 and second cross arm 570 will cause that portion of the first cross arm 530 and second cross arm 570 positioned outside of the first and second sleeves (520 and 525) of the collar 505 to bend, flex and deform and rebound back to its original shape, thus reducing or preventing damage to the cross arm assembly 500 caused by galloping, wind, ice, and snow. Because the movement of the first cross arm and second cross arm 530 and 570 is reduced the wear and tear on the first cross arm 530 and second cross arm 570 within the cross arm assembly 500 is reduced.

It is to be appreciated that embodiments of the cross arm assembly 500, synthetic cross arm 100, and collar 300, may be shipped with the cross arm assembly 500, synthetic cross arm 100, or collar 300, fully or partially disassembled in the form of a kit, or fully or partially assembled, as will be readily appreciated by persons of ordinary skill in the art having the benefit of the instant disclosure.

From the above description, it is clear that the inventive concepts disclosed herein are adapted to carry out the objects and to attain the advantages mentioned herein as well as those inherent in the inventive concepts disclosed herein. While exemplary embodiments of the inventive concepts disclosed herein have been described for purposes of this disclosure, it will be understood that numerous changes may be made which will readily suggest themselves to those skilled in the art and which are accomplished within the broad scope of the inventive concepts disclosed herein and defined by the appended claims.

What is claimed is:

1. A synthetic cross arm for a utility pole, the synthetic cross arm comprising:

a flexible housing having a first end, a second end, a top, a bottom, and a front and back defining a chamber therein;

a cable connected to the flexible housing, the cable positioned within the chamber of the flexible housing and extending between the first end and the second end of the flexible housing;

a first connector member positioned within the chamber of the flexible housing, the first connector member having a first end connected to the top of the flexible housing and a second end connected to the bottom of the flexible housing; and a second connector member positioned within the chamber of the flexible housing, the second connector member having a first end connected to the top of the flexible housing and a second end connected to the bottom of the flexible housing.

2. The synthetic cross arm of claim 1, wherein the cable is looped around the first connector member and the second connector member.

3. The synthetic cross arm of claim 1, further comprising insulation positioned within the chamber of the flexible housing.

4. The synthetic cross arm of claim 1, wherein the flexible housing is formed from fiberglass.

5. The synthetic cross arm of claim 4, wherein the flexible housing has ultraviolet resistant properties.

6. The synthetic cross arm of claim 1, wherein the cable is formed from rope.

7. The synthetic cross arm of claim 1, wherein the cable is formed from metal.

8. The synthetic cross arm of claim 1, wherein the flexible housing further comprises at least one opening extending there through for receiving a connecting bolt.

* * * * *